UNITED STATES PATENT OFFICE.

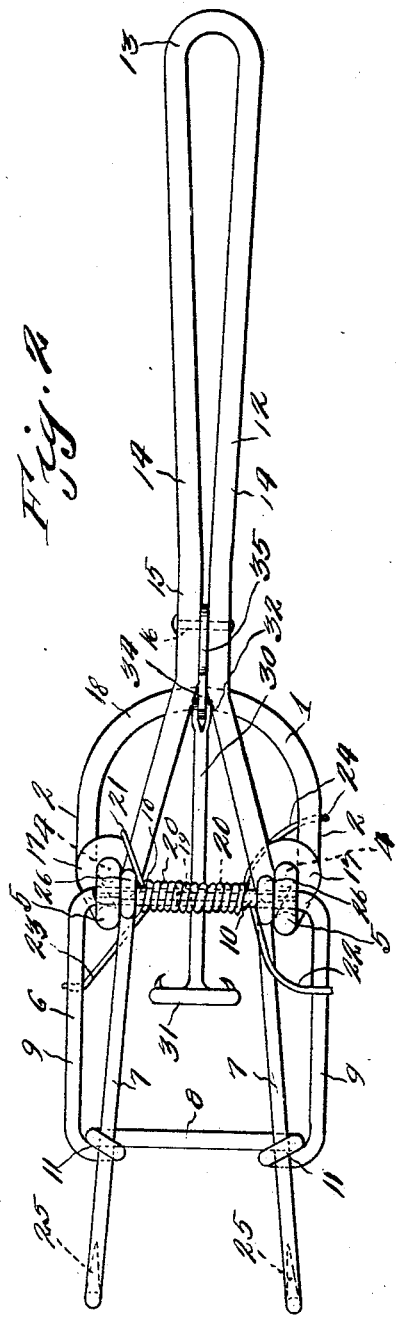

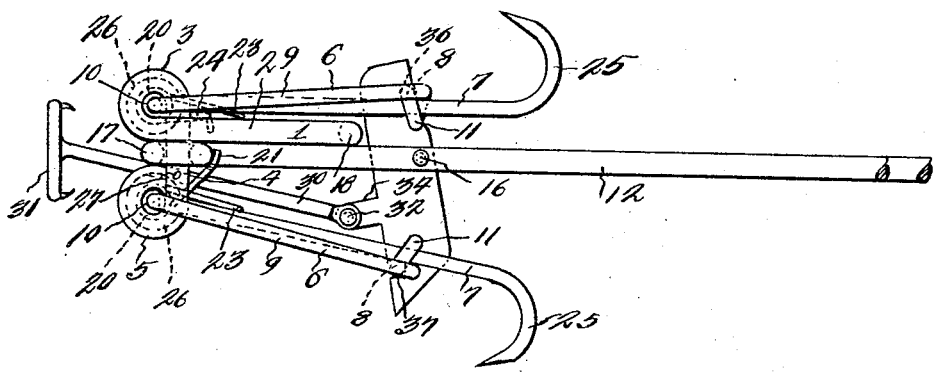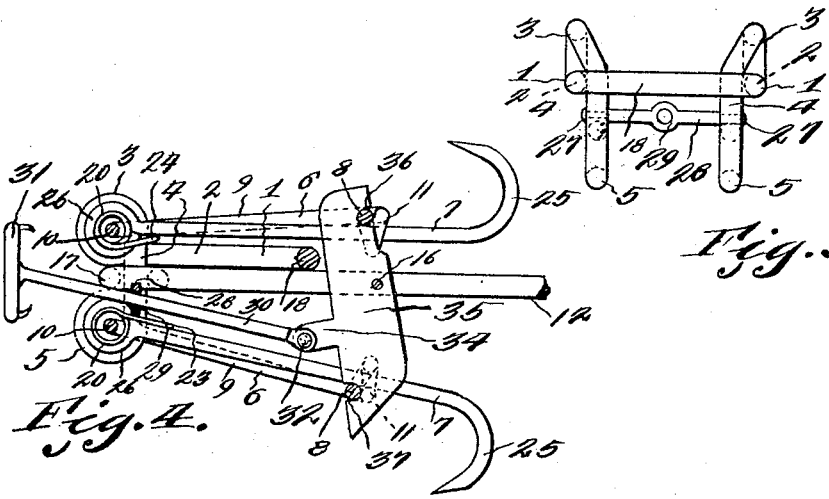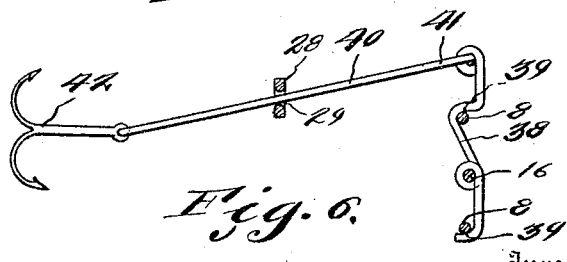

WILLIAM T. SOURBEER AND LOUIS E. PAYNE, OF LIVIA, KENTUCKY.

ANIMAL-TRAP.

1,198,286.   Specification of Letters Patent.   Patented Sept. 12, 1916.

Application filed June 1, 1916. Serial No. 101,099.

*To all whom it may concern:*

Be it known that we, WILLIAM T. SOURBEER and LOUIS E. PAYNE, citizens of the United States, residing at Livia, in the county of Daviess, State of Kentucky, have invented a new and useful Animal-Trap; and we do hereby declare the following to be a full, clear, and exact description of the invention, such as will enable others skilled in the art to which it appertains to make and use the same.

This invention relates to the art of fishing and trapping, and more especially to a new and useful automatically actuated animal trap, and an object of the invention is to provide a trap of this kind, which is simple, efficient and practical in construction.

Another object of the invention is the provision of a suitable frame, having spring tensioned pronged jaws, which are set by turning them on their pivots rearwardly, to be engaged by an oscillatory latch member, which is actuated by a bait holding push rod, to release the jaws, when the animal pushes upon said rod.

In practical fields the details of construction may necessitate alterations falling within the scope of what is claimed.

The invention comprises further features and combination of parts as hereinafter set forth, shown in the drawings and claimed.

In the drawings: Figure 1 is a view in side elevation of the improved trap constructed in accordance with the invention. Fig. 2 is a bottom plan view. Fig. 3 is a view in side elevation showing the jaws set. Fig. 4 is a sectional view through Fig. 3. Fig. 5 is a detail view of a portion of the frame of the trap. Fig. 6 is a view partly in section and partly in elevation, showing how a fish hook may be connected to a member 38 (which performs the same function as the member 35, but in the opposite direction) by means of a rod 40, whereby the trap may be used for catching fish.

Referring more especially to the drawings 1 designates the U-shaped frame, the arms 2 of which are extended forwardly, and turned into eyes 3, and into vertical parts 4 extending downwardly. The extremities of the vertical parts 4 are turned into eyes 5. A pair of holding pivoted frames 6 for the trap jaws 7 are provided. Each holding frame 6 is bent to form the transverse part 8, the side arms 9, and the rear inwardly and transversely disposed arms 10 which are at right angles to the arms 9. Where the arms 9 of each holding frame merge from the transverse part 8, the steel wire material is coiled to form the eyes 11, through which the body portions of the jaws slidably engage.

The main body or frame 12 of the trap consists of an elongated piece of heavy steel wire material bent upon itself to form the loop or handle end 13, while the arms 14 or sides of the handle or loop or body merge toward each other as shown at 15, there being a pin 16 riveted through the sides 14, in order to hold them in place. The sides or arms 14 beyond the pin 16 diverge and have their extremities terminating in eyes 17, through which the vertical parts 4 of the frame 1 extend, so that the curved or arched parts 18 of said frame 1 rests upon the side arms 15. The adjacent ends of each pair of inwardly extending arms 10 may be soldered, welded or otherwise connected as shown at 19. Mounted upon each set of the arms 10 is a coil spring 20. One end of the lower coil spring overlies one of the arms 15 of the body or frame 12 adjacent one of the eyes 17, as shown at 21, and the other end 22 of the lower coil spring engages over one of the side arms 9 of the lower holding pivoted frame 6. One end 23 of the upper coil spring 20 extends forwardly and laterally and overlies one of the sides 9 of the upper holding pivoted frame, while the other end 24 of the upper coil spring engages over one side of the frame 1. The extreme end portion of the jaws 7 terminate in curved hooks 25, the hooks of the upper jaws extending toward the hooks of the lower jaws and vice versa. The other ends of the jaws 7 are turned into eyes, through which the inwardly extending arms 10 pass; therefore by virtue of said eyes 26, the jaws 7 are pivotally mounted. Extending transversely of the frame 1 from one vertical part 4 to the opposite vertical part 4 and riveted in said vertical parts 4 as shown at 27 is a transverse bar 28 having a circular opening 29 at its central portion, through which the trap actuating member or rod 30 loosely slides. This trap, actuating member or rod at one end is provided with bait holding means 31, while its other bifurcated end is connected by means of a pivot pin 32 to a lug 34 of the oscillatory member 35, which is pivotally mounted upon the pin 16. The upper rear edge of the member 35 is provided with a notch 36 to be engaged by the transverse part 8 of the upper holding frame 6, while the lower portion of the forward edge of said member 35 is provided with a notch 35, to be engaged by the transverse part 8 of the lower holding frame 6, that is, when the jaws are set as shown in Figs. 3 and 4. When the push rod or bait member 30 provided with bait, and the jaws set, and the pushing action is imparted to the member 30, the member 35 is oscillated upon its pivot, thereby disengaging the notches 36 and 37 from their respective transverse parts 8 of the holding frames 6, thereby allowing the jaws to spring together, thereby trapping the animal. It is to be noted that an oscillatory member 38 shown in Fig. 6 may be substituted for the member 35, and in this case the shoulders 39 will engage the transverse parts 8 of said upper and lower holding frames 6. In this structure a pull rod 40 is substituted for the push rod 30, and has its ends 41 connected in an eye at the upper end of the member 38, while its other end has pivoted thereto a conventional form of fish hook 42, thereby adapting the trap as a fish trap, which requires a pull instead of a push to oscillate the latch, to release the spring tensioned trap jaws.

The invention having been set forth what is claimed as new and useful is:—

In an animal trap, the combination of a body frame having the extremities of the sides thereof terminating in eyes, an auxiliary U-shaped frame resting upon the sides of the body frame, the arms of said U-shaped auxiliary frame merging into eyes and having vertical parts beyond the eyes, the lower extremities of said vertical parts terminating in eyes, upper and lower jaw holding frames pivotally mounted in the upper and lower eyes of the auxiliary U-shaped frame, said upper and lower eyes of said U-shaped auxiliary frame engaging above and below the eyes of the sides of the body frame, thereby insuring a rigid structure, jaws pivotally mounted on the rear parts of the upper and lower jaw holding frames and being connected to the outer end of said jaw holding frames, spring tensioned means for said jaws, an oscillatory latch pivotally mounted in the body frame, a guide connecting the opposite vertical parts of said auxiliary frame, said latch having notches to be engaged by the free portions of the upper and lower jaw holding frames, and a reciprocating member mounted in said guides and being connected to said latch to oscillate the latch to release the notches from engagement with the jaws.

In testimony whereof we have signed our names to this specification in the presence of two subscribing witnesses.

WILLIAM T. SOURBEER.
LOUIS E. PAYNE.

Witnesses:
GROVER C. HILL,
ALBERT GOODWIN.

Copies of this patent may be obtained for five cents each, by addressing the "Commissioner of Patents, Washington, D. C."